United States Patent
Trattler et al.

(10) Patent No.: US 12,298,441 B2
(45) Date of Patent: May 13, 2025

(54) WINDOW AND MIRROR PRESENCE DETECTION SYSTEM AND CORRESPONDING METHOD

(71) Applicant: ams International AG, Jona (CH)

(72) Inventors: Peter Trattler, Pirka (AT); Dan Jacobs, Hitzendorf (AT)

(73) Assignee: AMS INTERNATIONAL AG, Jona (CH)

( * ) Notice: Subject to any disclaimer, the term of this patent is extended or adjusted under 35 U.S.C. 154(b) by 147 days.

(21) Appl. No.: 18/012,152

(22) PCT Filed: Jun. 29, 2021

(86) PCT No.: PCT/EP2021/067912
§ 371 (c)(1),
(2) Date: Dec. 21, 2022

(87) PCT Pub. No.: WO2022/002974
PCT Pub. Date: Jan. 6, 2022

(65) Prior Publication Data
US 2023/0296740 A1 Sep. 21, 2023

(30) Foreign Application Priority Data
Jun. 30, 2020 (GB) ..................... 2009945

(51) Int. Cl.
*G01S 7/4865* (2020.01)
*G01S 7/48* (2006.01)
(Continued)

(52) U.S. Cl.
CPC .......... *G01S 7/4865* (2013.01); *G01S 7/4802* (2013.01); *G01S 17/10* (2013.01); *G01S 17/86* (2020.01); *H04N 23/67* (2023.01)

(58) Field of Classification Search
CPC ...... G01S 7/4865; G01S 7/4802; G01S 17/10; G01S 17/86; G01S 7/481; G01S 7/4873;
(Continued)

(56) References Cited

U.S. PATENT DOCUMENTS 10,594,920 B2 * 3/2020 Yang ..................... G01S 7/4863
2017/0366737 A1 12/2017 Yang et al.
(Continued)

FOREIGN PATENT DOCUMENTS

EP 3 460 509 A1 3/2019

OTHER PUBLICATIONS

Van Norel, Jan (PCT Authorized Officer), International Search Report and Written Opinion mailed Aug. 30, 2021 in corresponding International Application No. PCT/EP2021/067912 (12 pages).
(Continued)

*Primary Examiner* — Marly S Camargo
(74) *Attorney, Agent, or Firm* — MH2 Technology Law Group LLP

(57) ABSTRACT

A presence detection system (700) configured to detect a presence of a window (130) or a mirror (330) is disclosed. The system comprises a time-of-flight sensor (110, 310, 610) configured to detect a proximity to a target (105, 305, 605) based on reflected radiation sensed from a plurality of zones (620*a-i*). The system also discloses processing circuitry (750) configured to determine a presence of a mirror or window in a path from the time-of-flight sensor to the target based on one or more peaks in data corresponding to the sensed radiation reflected from each of the plurality of zones. A corresponding method of detecting a presence of a window or a mirror using the disclosed system is also disclosed.

15 Claims, 12 Drawing Sheets

(51) Int. Cl.
*G01S 17/10* (2020.01)
*G01S 17/86* (2020.01)
*G01S 17/89* (2020.01)
*H04N 23/61* (2023.01)
*H04N 23/67* (2023.01)

(58) Field of Classification Search
CPC ...... G01S 17/89; H04N 23/67; H04N 23/671; H03N 23/61
See application file for complete search history.

(56) References Cited

U.S. PATENT DOCUMENTS

| | | | |
|---|---|---|---|
| 2018/0089848 A1 | 3/2018 | Yang et al. | |
| 2019/0056497 A1 | 2/2019 | Pacala et al. | |
| 2020/0026031 A1* | 1/2020 | Li | G02B 7/09 |
| 2022/0035032 A1* | 2/2022 | Meyers | G01S 17/10 |
| 2024/0085536 A1* | 3/2024 | Fu | G01S 7/4865 |

OTHER PUBLICATIONS

Lindner, N. (Authorized Officer), International Preliminary Report on Patentability mailed Jan. 12, 2023 in corresponding International Application No. PCT/EP2021/067912 (9 pages).

* cited by examiner

WINDOW AND MIRROR PRESENCE DETECTION SYSTEM AND CORRESPONDING METHOD

CROSS-REFERENCE TO RELATED APPLICATIONS

The present application is the national stage entry of International Patent Application No. PCT/EP2021/067912, filed on Jun. 29, 2021, and published as WO 2021/002974 A1 on Jan. 6, 2022, which claims priority to GB Application No. 2009945.3, filed on Jun. 30, 2020, the disclosures of all of which are incorporated by reference herein in their entireties.

TECHNICAL FIELD OF THE DISCLOSURE

The present disclosure is in the field of presence detection systems, and in particular presence detection systems comprising time-of-flight sensors.

BACKGROUND OF THE DISCLOSURE

Imaging devices, such as cameras implemented on cellular telephones, typically have an adjustable focus to allow imaging of targets at a range of distances from the imaging device.

In some instances, a focus of the imaging device may be manually adjusted. However, such manual adjustment is generally slow, and an accuracy of a selected focus may be limited by, for example, an ability of the user.

More generally, modern imaging devices tend to implement auto-focus functionality. For example, some imaging devices may implement a Contrast Detection Auto Focus (CDAF) system. A CDAF system generally assesses a contrast of received images from a plurality of different focusses and iteratively adjusts a focusing means, such as a lens position, until an image with a desired contrast is received. Such a system, while potentially more accurate than manual focussing, may be relatively slow to determine an optimal focus.

More recently, imaging devices have been implemented with proximity sensors for providing an indication of a distance to a target to be imaged. Such an indication may be used to adjust a focus of the imaging device, and may be substantially quicker and more accurate than a CDAF system, or than manual focussing.

Systems employing a proximity sensor to determine a distance to a target and to adjust a focus accordingly may be known as Laser Auto Focus (LAF) or Laser Detect Auto Focus (LDAF) systems. While such LAF/LDAF systems may provide rapid and accurate focussing, the proximity sensors may be prone to errors when a reflective surface such as a mirror, or a partially reflective surface such as a window, resides in a path between the proximity sensor and a target to be sensed. Such errors may result in an incorrect focus of the imaging device.

It is therefore desirable to be able to provide means to accurately, reliably and rapidly determine a proximity of a target to an imaging device for use in auto-focus applications, wherein use cases of the imaging device may include a mirror or window in a path between the imaging device and a target to be imaged.

It is therefore an aim of at least one embodiment of at least one aspect of the present disclosure to obviate or at least mitigate at least one of the above identified shortcomings of the prior art.

SUMMARY

The present disclosure relates to a presence detection system for use in an auto-focusing imaging device, such as a camera or the like.

According to a first aspect of the disclosure, there is provided a presence detection system configured to detect a presence of a window or a mirror. The system comprises a time-of-flight sensor configured to detect a proximity to a target based on reflected radiation sensed from a plurality of zones.

The system also comprises processing circuitry configured to determine a presence of a mirror or window in a path from the time-of-flight sensor to the target based on one or more peaks in data corresponding to the sensed radiation reflected from each of the plurality of zones.

Advantageously, by detecting a presence of a window or mirror, the system may be suitable for use in imaging devices, such as cameras, to provide reliable, accurate and fast auto-focussing functionality in window or mirror use cases.

Advantageously, by basing a determination of a depth of focus on time-of-flight data, the determination may be made more quickly than in prior art auto-focus systems, why may rely upon iterative post-processing of a plurality of image data to determine a correct depth of focus.

Advantageously, a speed of operation of the presence detection system may be defined, at least in part, by the capabilities of the processing circuitry, e.g. a computational efficiency or speed of the processing circuitry. As such, a speed of the disclosed system may be readily adapted or scaled to a particular application which may prioritise speed of operation and/or power constraints accordingly.

The time-of-flight sensor may comprise one or more radiation emitters. The radiation emitter may be a laser, such as a vertical cavity surface emitting laser (VCSEL). The time-of-flight sensor may comprise a radiation sensor configured to sense radiation having a wavelength corresponding to a wavelength of radiation emitted by the radiation emitter. The radiation sensor may comprise a Single Photon Avalanche Diode (SPAD), or an array of SPADs. The time-of-flight sensor may comprise one or more time-to-digital converters (TDCs), configured to indicate a time between an emitted pulse of radiation and one or more received pulses of radiation. The time-of-flight sensor may comprise a histogram block configured to accumulate data from the one or more TDCs in a histogram. The processing circuitry may be configured to generate an output signal indicative of a time-of-flight based on an evaluation of the histogram.

The plurality of zones may comprise an array of zones such as, for example, a 2×2, 3×3, 4×4 or an even larger array of zones. Each zone of the plurality of zones may define an area or field sensed by the time-of-flight sensor. Each area or field may be distinct, or may at least partially overlap an area or field of a zone defined by at least one adjacent zone.

The time-of-flight sensor may be known in the art as a 'multi-zone sensor', a 'multi-zone proximity sensor', a 'multizone sensor', or the like.

The presence detection system may be an integrated device. For example, the time-of-flight sensor and the processing circuitry, or at least a portion of the processing circuitry, may be integrated into a package, a module such as a multi-chip module, and/or provided as a monolithic device, e.g. time-of-flight sensor and the processing circuitry may be embedded on the same die.

The presence detection system may comprise a computer system. For example, the time-of-flight sensor may be coupled, such as communicably coupled, to processing circuitry within a computer system.

The processing circuitry may be a host device. The processing circuitry may comprise a processor. The processing circuitry may be provided on a first Printed Circuit Board (PCB). The time-of-flight sensor may be coupled to, on mounted on, the first PCB. Alternatively, the time-of-flight sensor may be mounted on a second PCB, the second PCB being communicably coupled to the first PCB.

The presence detection system may be provided as a distributed system. That is, at least a portion of the processing circuitry and/or storage such as one or more memory devices associated with the processing circuitry, may be remote from the time-of-flight sensor. For example, at least a portion of the processing circuitry may be provided on one or more servers and/or cloud-based devices. At least a portion of the processing circuitry may be provided on a remote console or client device.

It will be understood by one of skill in the art that the term 'mirror' refers to a generally reflective surface. In particular, such a surface will be understood to be reflective to radiation having a wavelength corresponding to a wavelength of radiation emitted by the time-of-flight sensor. The term mirror may relate to a substantially glass surface. The term mirror may relate to a metallic surface, a dielectric surface, or any other reflective surface. A mirror may refer to a glass surface with a reflective coating.

Similarly, it will be understood by one of skill in the art that the term 'window' refers to a substantially transparent, but also partially reflective surface. In particular, such a surface will be understood to be substantially transparent, but at least partially reflective to radiation having a wavelength corresponding to a wavelength of radiation emitted by the time-of-flight sensor. The term window may refer to a glass surface. The window may be generally perceived by the human eye to be transparent to visible light. The term window may refer to a plurality of glass surfaces, e.g. a double or triple glazed window.

The one or more peaks in data may correspond to reflected radiation above a threshold defined by a noise level. For example, noise may be averaged, filtered, and/or otherwise smoothed, to define a level corresponding to a threshold. As such, a peak or spike in data that is substantially greater than level of noise would exceed the threshold, and thus be readily be identifiable as a peak or spike. The threshold may correspond to a multiple of the noise level. The threshold may correspond to an offset from the noise level. The processing circuitry may be configured to determine the noise level.

In some instances, the data may comprise a plurality of peaks in each of one or more zones. For example, data associated with a single zone may comprise two or more peaks. The plurality of peaks may correspond to a plurality of objects or targets that reflect photons. As such, the time-of-flight sensor and/or the presence detection system may be known in the art as a capable of 'multi-object' detection.

The data may correspond to a distribution of a number of sensed photons as a function of a distance from the time-of-flight sensor. That is, the data may be provided as, or correspond to, a count of sensed photons as a function of time. Since the speed of the photons is known, and for example may be assumed to be approximately $3\times10^8$ ms$^{-1}$, such a time directly corresponds to a distance. The data may be provided, or stored, as a histogram. Circuitry within the time-of-flight sensor and/or the processing circuitry may be configured to store the data as a histogram. The time-of-flight sensor may store the data as a histogram, or in a format corresponding to a histogram, and make the data available to the processing circuitry.

The processing circuitry may be configured to determine the presence of the mirror or the window by comparing data corresponding to at least two zones of the plurality of zones.

The processing circuitry may be configured to compare a determined peak in a first zone, e.g. a time and/or corresponding distance and/or magnitude and/or width and/or shape, with a determined peak in a second zone.

The processing circuitry may be configured to compare a determined peak occurring at a first time or distance in a first zone with data substantially corresponding to the first time or distance in the second zone. For example, as described in more detail below, the processing circuitry may be configured to compare one or more peaks across a plurality of zones. The processing circuitry may be configured to identify an absence of one or more peaks in a first zone at a time or distance corresponding to the presence of one or more peaks in a second zone.

If the data comprises: a peak corresponding to a first distance from the time-of-flight sensor and a peak corresponding to a second distance from the time-of-flight sensor in a first zone of the plurality of zones; and a peak substantially corresponding to the first distance and a peak substantially corresponding to the second distance in a second zone of the plurality of zones; and the second distance is further than the first distance; and the peaks are not associated with reflections from a cover glass; then the processing circuitry may determine that the peak corresponding to the first distance from the time-of-flight sensor corresponds to reflections from a mirror or a window.

Advantageously, if a determination is made that reflections are from a mirror or a window, then one or more subsequent peaks in the data that may correspond to the target may be used to define a depth of focus of an imaging device.

The cover glass may be, for example, a protective component of the time-of-flight sensor. The cover glass may be a component of an optical system in which the presence detection system is implemented. The cover glass may be disposed at a fixed distance from the time-of-flight sensor. As such, the processing circuitry may readily determine that a peak corresponding to the fixed distance is a peak corresponding to the cover glass. Therefore, a peak corresponding to the cover glass may be automatically rejected by the processing circuitry.

Additionally or alternatively, one or more optical components may be disposed at one or more fixed distances relative to the time-of-flight sensor. For example, one or more lenses may be disposed between the time-of-flight sensor and a target. As such, the processing circuitry may readily determine that one or more peaks corresponding to the one or more fixed distances may corresponding to the one or more optical components.

If the second distance is substantially double the first distance, then the processing circuitry may determine that the peak corresponding to the first distance from the time-of-flight sensor corresponds to reflections from a mirror.

Advantageously, by determining that the reflections are from a mirror, a focus of an imaging device implementing the disclosed presence detection system may be adjusted accordingly to avoid focussing on the mirror and instead to focus on the target.

Advantageously, by determining that the reflections are from a mirror, the processing circuitry may infer information about a use-case of an imaging device implementing the disclosed presence detection system. For example, the processing circuitry, or a further processing means associated with the imaging device, may infer that a photograph, such as a photograph of a user of the imaging device, is being taken by the user by directing the imaging device towards the mirror. The imaging device may then adjust one or more settings accordingly, such as for example, lighting conditions and/or image enhancement settings and/or a depth of focus.

If the peak corresponding to the first distance from the time-of-flight sensor has a magnitude above a predefined threshold and/or is characterized by pileup greater than a/the predefined threshold, the processing circuitry may determine that the peak corresponding to the first distance from the time-of-flight sensor corresponds to reflections from a mirror. Alternatively, the processing circuitry may first pileup correct the histogram data before applying this peak, e.g. correct the data for the effects of pile-up. The processing circuitry may be configured to correct the data for the effects of pile-up.

The term 'pileup' may be understood to refer to a skew in data caused by limitations of the time-of-flight sensor, in particular a Single Photon Avalanche Detector (SPAD) and TDC (time to digital converter) based time-of-flight sensor. In such SPAD/TDC-based sensors, earlier photons of a pulse of radiation from the time-of-flight sensor may be more likely to trigger an event in the TDC than later photons which may be more likely to arrive at the sensors during a dead time of the SPAD. Photons arriving in the dead-time, e.g. a quench time of the SPAD, are not detected, leading to a skew in data. The processing means may be configured to determine if such a skew in the data is present. The processing means may be configured to determine whether to pile-up correct this data, e.g. correct the data for the effects of pile-up.

The predefined threshold(s) may be determined by a user. The predefined threshold(s) may be stored in a memory of the presence detection system. The predefined threshold(s) may be determined during a production, calibration, and/or initial or subsequent programming of the presence detection system.

If the first peak is substantially wider than a width defined by a further predefined threshold, then the processing circuitry may determine that the peak corresponding to the first distance from the time-of-flight sensor corresponds to reflections from a window, and that the window comprises a plurality of panes of glass.

Advantageously, one or more characteristics or settings such as a depth of focus or lighting conditions of an imaging device implementing the disclosed presence detection system may be adjusted in response to a determination that the window comprises a plurality of panes of glass.

The processing circuitry may be configured to determine which zone of the plurality of zones comprises a peak with the greatest magnitude substantially corresponding to the first distance, and to indicate that the determined zone may be the zone oriented closest to perpendicular relative to the window or mirror.

Advantageously, by determining the zone which is oriented closest to perpendicular relative to the window or mirror, an orientation of the presence detection system relative to the window or mirror and/or to the target may be determined. Such a determination may, for example, permit a more accurate configuration of an imaging device, or provide information for post-processing of an image.

If the data comprises: a peak with a magnitude above a first threshold corresponding to a relatively short distance from the time-of-flight sensor in a/the first zone of the plurality of zones, the relatively short distance defined by a second threshold; and substantially no peak corresponding to the relatively short distance from the time-of-flight sensor in a/the second zone of the plurality of zones; then the processing circuitry may determine that the time-of-flight sensor is disposed at the relatively short distance from a window.

The relatively short distance may, for example, be a distance generally comparable in magnitude to a distance from the time-of-flight sensor to a cover glass. That is, the relatively short distance may be a distance in the region of one inch, or less. The relatively short distance may be a distance in the region of one centimetre or less. The relatively short distance may correspond to a distance from the time-of-flight sensor to an extremity, such as an outer surface, of a device in which the presence detection system is implemented.

Beneficially, by determining that the time-of-flight sensor is disposed at the relatively short distance from a window, information pertaining to a use case of the presence detection system may be determined. For example, it may be determined that a camera comprising the presence detection system is being held against a window in order to photograph a target disposed on an opposite side of the window.

The processing circuitry may be configured to determine whether one or more peaks in the data is associated with reflections from a/the cover glass.

Beneficially, the processing circuitry may be configured to disregard peaks in the data that correspond to a cover glass, or to any other optical element such as a lens that may be disposed at a fixed distance relative to the presence detection system. As such, the processing circuitry may be configured to avoid focusing an imaging device implementing the presence detection system on the cover glass or optical element.

The processing circuitry may be configured to store the data for each of the plurality of zones in bins, wherein each bin corresponds to a number of sensed photons as a function of distance from the time-of-flight sensor.

Data in each bin may correspond to a time of arrival of reflected photons at the time-of-flight sensor, wherein the time of arrival directly corresponds to a distance from the time-of-flight sensor.

The time-of-flight sensor may be configured to store the data for each of the plurality of zones in bins, wherein each bin corresponds to a number of sensed photons as a function of distance from the time-of-flight sensor.

Beneficially, the provision of data in bins, which may correspond to a histogram of data, may simplify an analysis of the data by the processing circuitry.

According to a second aspect of the disclosure, there is provided an apparatus comprising: an imaging system with an adjustable focus, and the presence detection system comprising a time-of-flight sensor according to the first aspect.

The focus of the imaging system is configured to be adjusted to avoid focussing on a window or mirror based on a determination of a presence of a mirror or window in a path from the time-of-flight sensor to a target by the presence detection system.

As such, the presence detection system may enable implementation of an auto-focus functionality of the imaging system.

The apparatus may be one of: a cellular telephone; a camera; or a video recording device; a robotic device; a measuring device; a gaming device; or an automotive device.

According to a third aspect of the disclosure, there is provided a method of detecting a presence of a window or a mirror, the method comprising the steps of: configuring a time-of-flight sensor to provide data corresponding to sensed reflected radiation from a plurality of zones; and analysing one or more peaks in the data corresponding to the sensed radiation reflected from each of the plurality of zones to determine if a window or a mirror is in a path from the time-of-flight sensor to a target.

The above summary is intended to be merely exemplary and non-limiting. The disclosure includes one or more corresponding aspects, embodiments or features in isolation or in various combinations whether or not specifically stated (including claimed) in that combination or in isolation. It should be understood that features defined above in accordance with any aspect of the present disclosure or below relating to any specific embodiment of the disclosure may be utilized, either alone or in combination with any other defined feature, in any other aspect or embodiment or to form a further aspect or embodiment of the disclosure.

BRIEF DESCRIPTION OF DRAWINGS

These and other aspects of the present invention will now be described, by way of example only, with reference to the accompanying drawings, which are:

FIG. 1b an example of a histogram corresponding to data from the sensor of the imaging device of FIG. 1a;

FIG. 2b an example of a histogram corresponding to data from the sensor of the imaging device of FIG. 2a;

FIG. 3b an example of a histogram corresponding to data from the sensor of the imaging device of FIG. 4a;

FIG. 4b an example of a histogram corresponding to data from the sensor of the imaging device of FIG. 5a;

FIG. 6b a representation of zones sensed by the multi-zone sensor of the apparatus of FIG. 6a;

DETAILED DESCRIPTION OF DRAWINGS

Figure 1A:
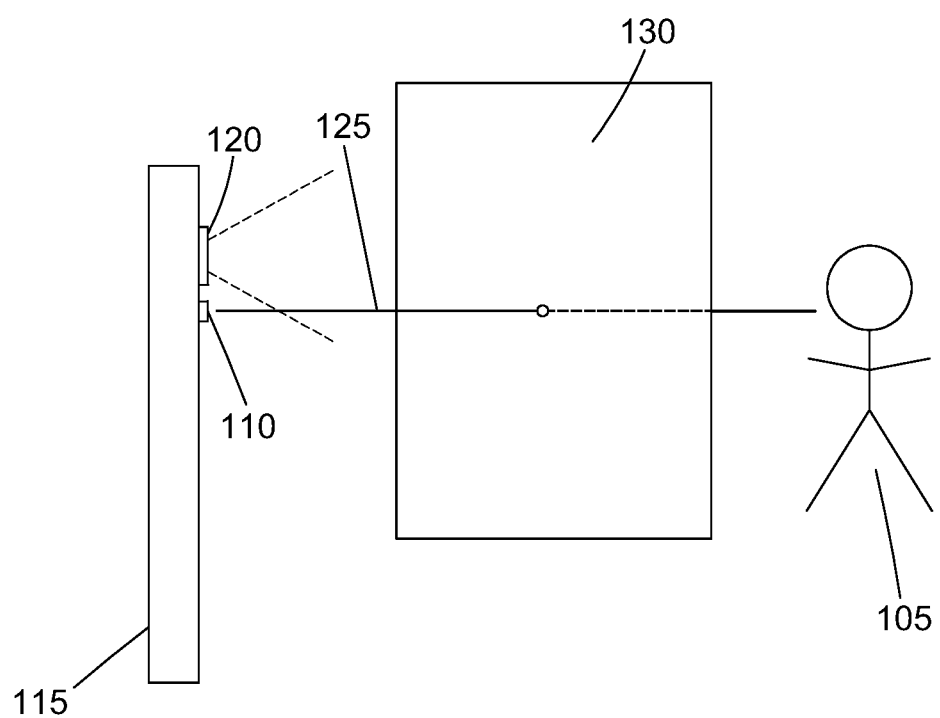
FIG. 1a a representation of an imaging device substantially perpendicular to a window.

FIG. 1a depicts a representation of an imaging device 115 substantially perpendicular to a window 130. A target 105 is disposed at an opposite side of the window 130 to the imaging device 115. The imaging device comprises a sensor 110. In the example of FIG. 1a, the target 105 is a person. For purposes of example, the depicted imaging device 115 is a cellular telephone. It will be appreciated that the sensor 110 may be a component of another imaging device or a system, such as a camera or the like. In some embodiments, the sensor 110 is a component of a system having an adjustable focus, such as to allow imaging of targets at a range of distances from the imaging device. In the example of FIG. 1a, the imaging device 115 is a cellular telephone comprising a camera 120.

In the example of FIG. 1, the sensor 110 is a time-of-flight sensor. The sensor 110 may be a direct time-of-flight sensor. In some embodiments, the sensor 110 may be an indirect time-of-flight sensor. As such, the sensor 110 is configured to detect a proximity to the target 105 based on sensed radiation 125 emitted from the sensor 110 and reflected from the target 105.

The time-of-flight sensor 110 may comprise one or more radiation emitters. The radiation emitter may be a laser, such as a vertical cavity surface emitting laser (VCSEL). The time-of-flight sensor 110 may be configured to sense radiation 125 having a wavelength corresponding to a wavelength of radiation 125 emitted by the radiation emitter. The sensor 110 may comprise a Single Photon Avalanche Diode (SPAD), or an array of SPADs. The sensor 110 may comprise one or more time-to-digital converters, configured to indicate a time between an emitted pulse of radiation and one or more received pulses of radiation 125. The sensor 110 may comprise a histogram block configured to accumulate data from the one or more time-to digital converters in a histogram. Processing circuitry may be configured to generate an output signal indicative of a time-of-flight based on an evaluation of the histogram, as described in more detail with reference to FIGS. 1b and 1c.

The sensor 110 may be configured to sense radiation 125 reflected from a plurality of different zones. Each zone of the plurality of zones may define an area or field sensed by the sensor 110. Each area or field may be distinct, or may at least partially overlap an area of field of a zone defined by at least one adjacent zone. Operation of such a multi-zone sensor is described in more detail below with reference to FIGS. 6a to 6c.

Also shown in FIG. 1a is a window 130 disposed in a path from the sensor 110 to the target 105. The window 130 is at least partly transparent to the radiation 125.

As such, at least a portion of radiation 125 emitted by the sensor 110 propagates through the window 130 and is reflected from the target 105. However, at least a portion of the radiation 125 is reflected from the window 130 itself. In some instances, a substantial majority of the radiation 125 is reflected by the window 130. Such reflections may be due, at least in part, to dirt, debris and/or other anomalies or artefacts present on and/or in the window 130. The window 130 may comprise one or more materials that are at least partially reflective to the radiation 125.

The radiation 125 depicted in FIG. 1a is shown as a dashed line between the window 130 and the target 105, and a solid line between the window 130 and the sensor 110, thus indicative of radiation travelling from the window 130 to the sensor 110 comprising both radiation reflected from the window 130 and radiation reflected from the target 105.

The example in FIG. 1a may correspond to a use-case of a user operating the camera 120 of the imaging device 115 to take a photograph of the target 105 through a window 130.

Figure 1B:
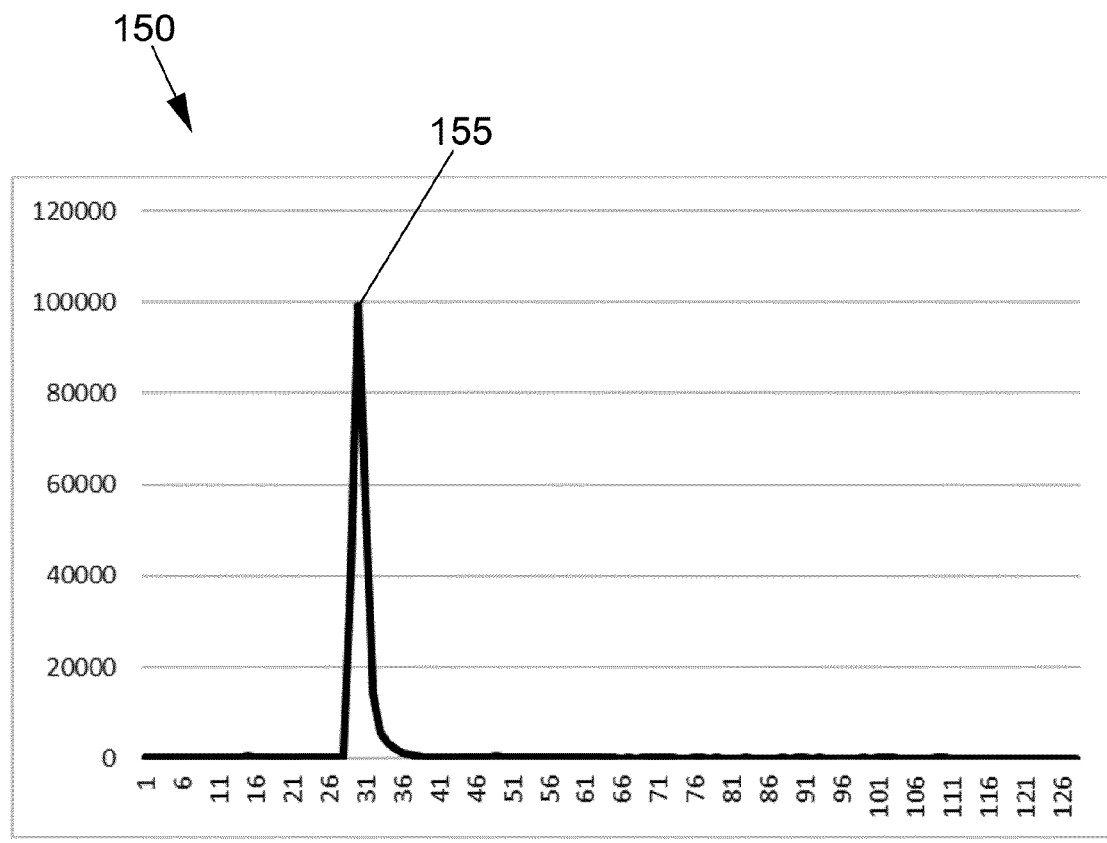

FIG. 1b depicts an example of a histogram 150 corresponding to data from the sensor 110 of FIG. 1a. The sensor 110, e.g. the time-of-flight sensor, or processing circuitry associated with the sensor 110, may provide data corresponding to a count of sensed photons as a function of time. Since the speed of the photons is known, and for example may be assumed to be approximately $3 \times 10^8$ ms$^{-1}$, such a time directly corresponds to a distance. The data may be provided, or stored, in a format or structure corresponding to the example histogram 150. Circuitry within the sensor 110 and/or processing circuitry may be configured to store the data as the histogram 150. The sensor 110 may store the data as the histogram 150, or in a format corresponding to a histogram, and may make the data available to processing circuitry.

The data depicted in the histogram 150 comprises a peak 155, which substantially corresponds to radiation reflected from the window 130. As such, the sensor 110 may be used to determine a proximity of the window 130 to the sensor.

Figure 1C:
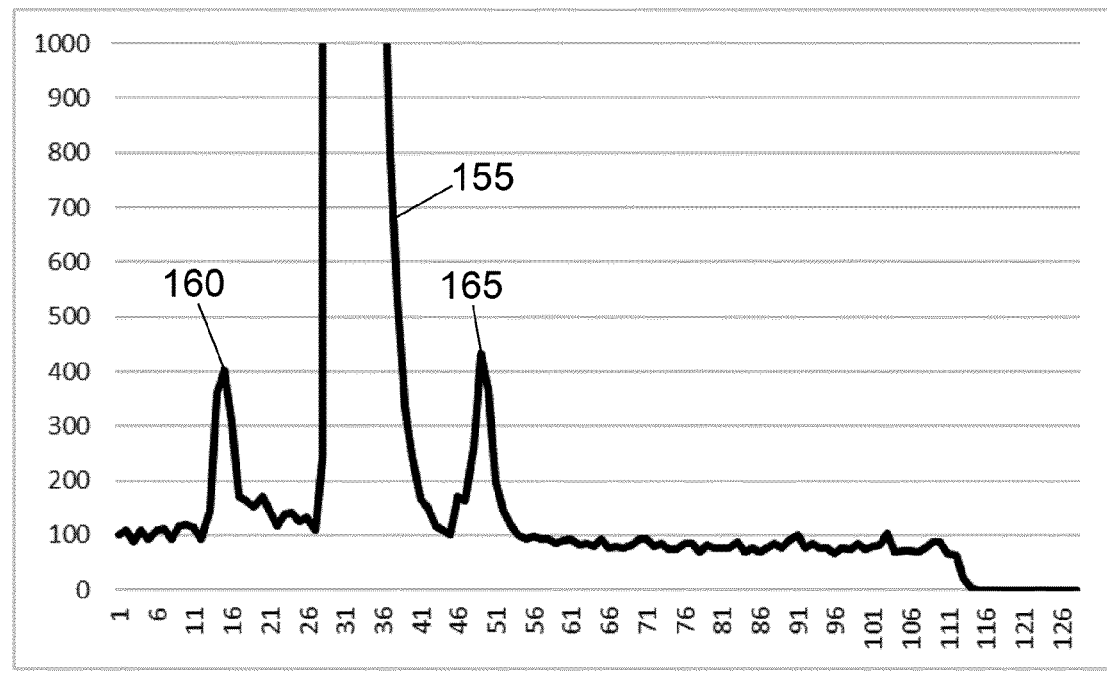
FIG. 1c a magnified portion of the histogram of FIG. 1b.

FIG. 1c, which depicts a magnified portion of the histogram of FIG. 1b, clearly shows three distinct peaks 155, 160, 165. The three peaks 155, 160, 165 correspond to reflected radiation above a threshold defined by a noise level. For example, noise may be averaged, filtered, and/or otherwise smoothed, to define a level corresponding to a threshold. As such, a peak or spike in data that is substantially greater than level of noise would exceed the threshold, and thus may be readily identifiable as a peak or spike. The threshold may correspond to a multiple of the noise level. The threshold may correspond to an offset from the noise level. The processing circuitry may be configured to determine the noise level. In the example of FIG. 1c, the noise level is between approximately 50 and 150 counts. As such, a first peak 160 having a magnitude of approximately 400 counts is clearly distinguishable over the noise level. Similarly, a third peak 165 having a magnitude of approximately 400 counts is clearly distinguishable over the noise level.

In the example of FIG. 1c, the first peak 160 corresponds to a cover glass. The cover glass may be, for example, a protective component of the sensor 110. The cover glass may be a component of an optical system in which the sensor 110 is implemented, e.g. the imaging device 115. As such, because the cover glass is disposed at a fixed distance from the sensor 110, the first peak 160 can be readily identified as corresponding to radiation reflected from the cover glass. That is, processing circuitry may readily determine, from the data depicted in histogram 200 of FIGS. 1b and 1c, that a first peak 160 corresponds to the cover glass, because the first peak 160 occurs at a time corresponding to a distance known to be the fixed between the sensor 110 and the cover glass.

The second peak 155 is substantially greater in magnitude than the first peak 160 or the third peak 165. The second peak corresponds to sensed radiation reflected from the window. Due to the relatively perpendicular orientation of the sensor 110 relative to the window 130, the reflected radiation comprises a substantial component of reflected specular radiation. The reflected radiation may also comprises a component of diffuse radiation, e.g. radiation that is more generally reflected from the window 130 due to, for example, the above described impurities, artefacts, dirt, dust or the like on or in the window.

The third peak 165 is substantially smaller in magnitude than the second peak 160. The third peak 165 corresponds to sensed radiation reflected from the target 105, e.g. the target 105 disposed at an opposite side of the window 130 to the sensor 110, as depicted in FIG. 1a. As such, by determining that a window 130 is present between the sensor 110 and the target 105, the sensor 110 may be able to determine a proximity of the target 105 to the sensor 110, as described in more detail below.

Figure 2A:
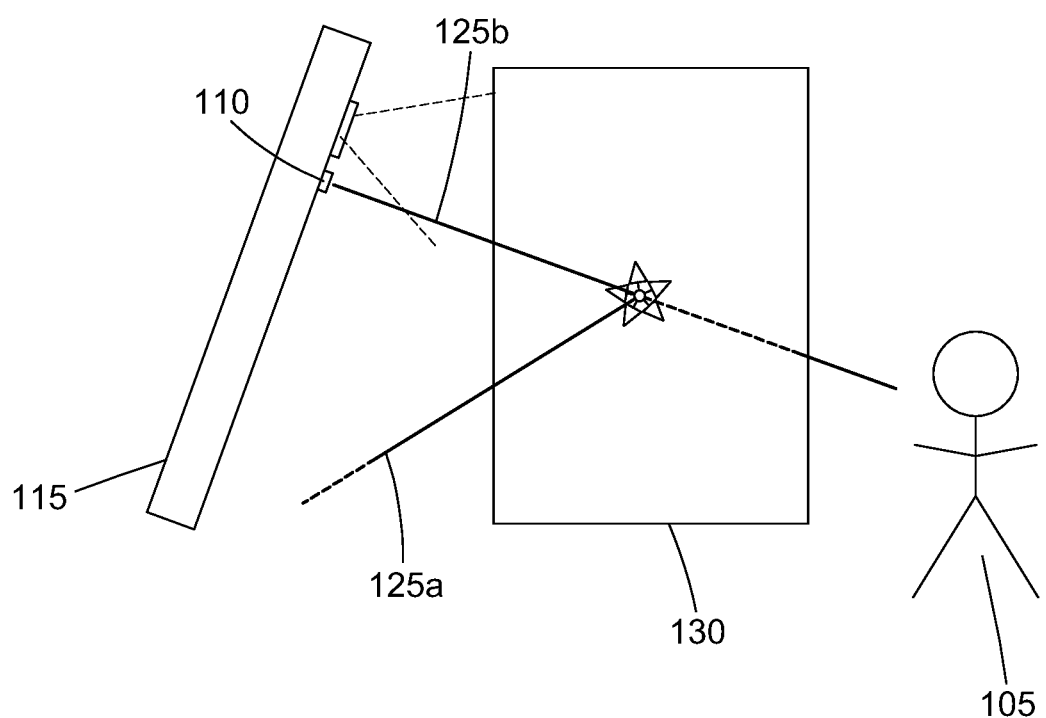
FIG. 2a a representation of the imaging device an angle relative to the window.

FIG. 2a depicts a representation of the imaging device 115 an angle e.g. not perpendicular, relative to the window 130. In a similar manner to the example of FIG. 1a, in this instance radiation 125b emitted from the sensor 110, e.g. the time-of-flight sensor, is reflected back to the sensor 110 from the window 130 and from the target 105.

However, in contrast to the example of FIG. 1a, a substantial portion of the radiation 125a that is reflected from the window 130 is not incident upon the sensor 110. That is, an amount of specular radiation sensed by the sensor is substantially reduced. This is because, taking account for an angle of incidence of the radiation on the window 130 and an angle of reflection of the radiation from the window 130, a substantial portion of the reflected radiation 1 is not directed toward the sensor 110.

A portion of radiation 125b, which may comprise diffuse radiation, is detected by the sensor 110. Such diffuse radiation may be due, at least in part, to dirt, debris and/or other anomalies or artefacts present on or in the window 130, causing radiation 125b to be reflected in the direction of the sensor 130. Furthermore, the portion of radiation 125b may comprise radiation reflected from the target 105.

Figure 2B:
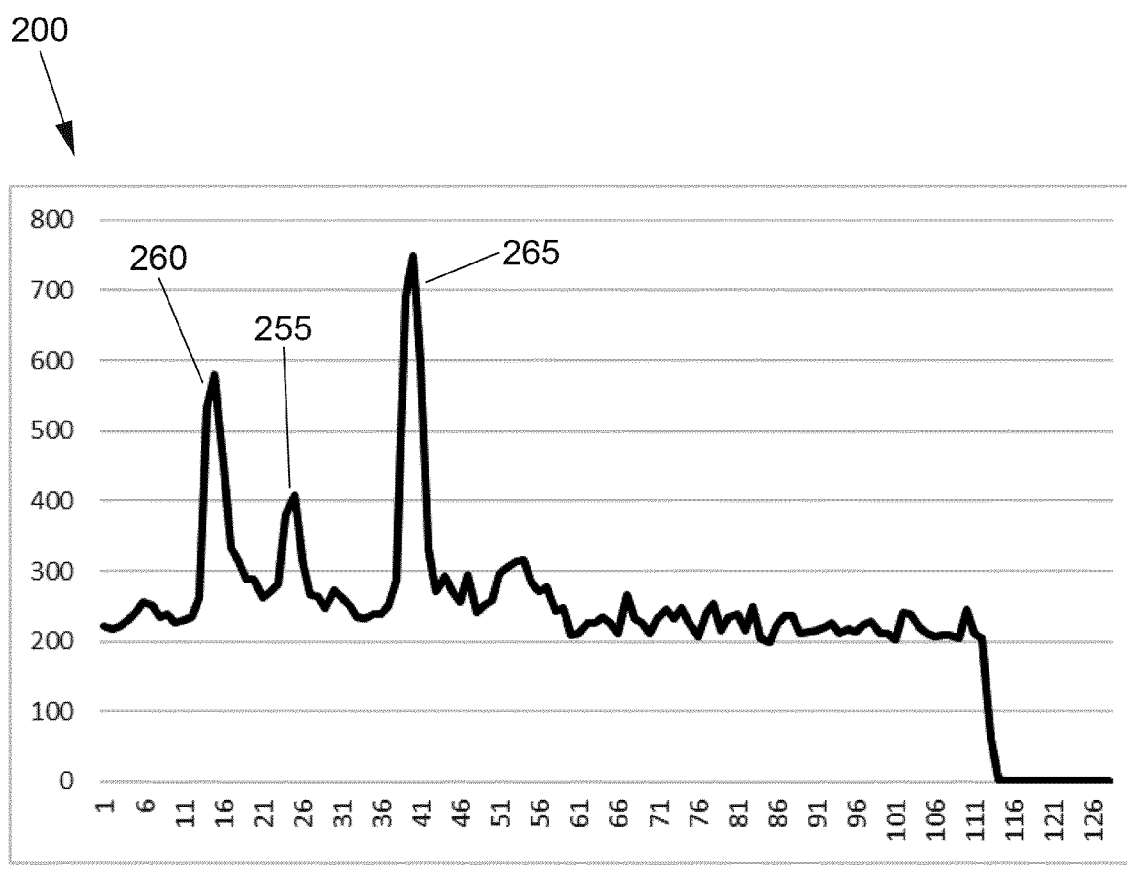

FIG. 2b depicts an example of a histogram 200 corresponding to data from the sensor of FIG. 2a. FIG. 2b clearly shows three distinct peaks 255, 260, 265. As described above, the peaks 255, 260, 265 correspond to reflected radiation above a threshold defined by a noise level.

The data depicted in the histogram 200 comprises a first peak 260 above the noise level. As described above, the first peak corresponds to a cover glass.

The data depicted in the histogram 200 comprises a second peak 255, which substantially corresponds to radiation reflected from the window 130. It will be noted that a magnitude of a peak 255 of a sensed reflection from the window 130 is substantially less than a magnitude of a peak 155 of sensed reflection from the window 130 depicted in FIGS. 1b and 1c. As described above, this is due to specular reflection of the radiation 125a not being detected by the sensor 110 due to angle of the sensor relative to the window 130.

The histogram 200 of FIG. 2b also depicts a third peak 265. The third peak 265 corresponds to sensed radiation 125b reflected from the target 105, e.g. the target 105 disposed at an opposite side of the window 130 to the sensor 110 as depicted in FIG. 2a.

Thus, it can be observed that by comparing histograms of data sensed from a target through a window substantially perpendicular to the sensor 110, e.g. equivalent to in a first zone relative to the sensor 110, and at an angle relative to the sensor 110, e.g. equivalent to in a second zone relative to the sensor 110, the absence of the second peak, or substantial reduction in the magnitude of the second peak, indicates that the window is present. Based on this principle, in an embodiment of the invention, a presence detection system such as a system implemented on a cellular telephone camera, may be configured to detect a presence of a window or a mirror. Such a system comprises a time-of-flight sensor configured to detect a proximity to a target based on reflected radiation sensed from a plurality of zones and processing circuitry configured to determine a presence of a mirror or window in a path from the time-of-flight sensor to the target based on one or more peaks in data corresponding to the sensed radiation reflected from each of the plurality of zones.

Figure 3A:
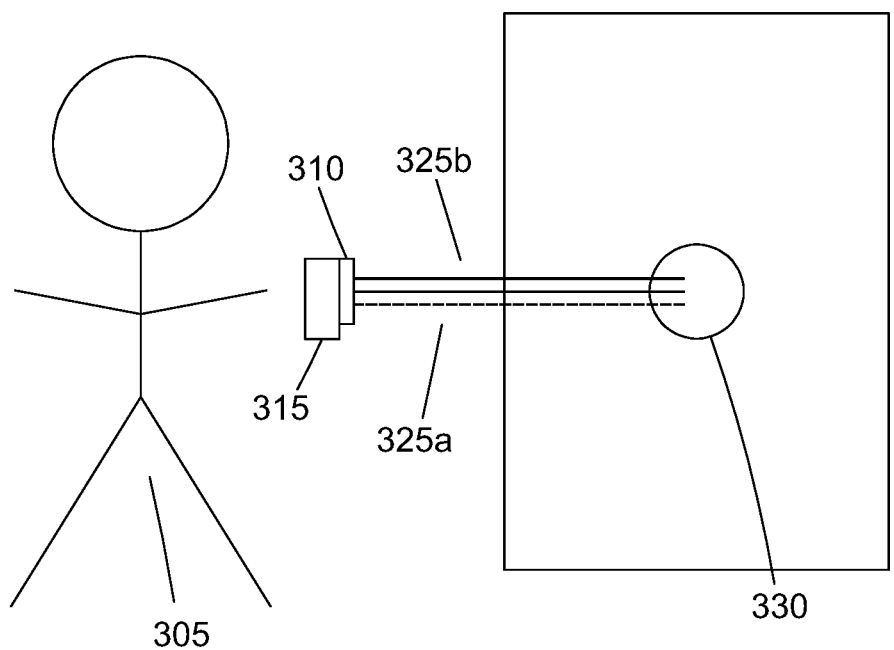
FIG. 3a a representation of the imaging device substantially perpendicular to a mirror.

FIG. 3a depicts a representation of an imaging device 315 substantially perpendicular to a mirror 330. The imaging device 315 comprises a sensor 310. Also shown is a target 305 which, for purposes of example, is a person. The depicted imaging device 315 is a cellular telephone. It will be appreciated that the sensor 310 may be a component of another imaging device or system, such as a camera or the like. In some embodiments, the sensor 310 is a component of a system having an adjustable focus, such as to allow imaging of targets at a range of distances from the imaging device. In the example of FIG. 3a, the imaging device 315 is a cellular telephone comprising a camera. In the example of FIG. 3a, the sensor 310 is a time-of-flight sensor. As such, the sensor 310 is configured to detect a proximity to the target 305 based on sensed radiation 325a, 325b reflected from the target. As described above with reference to the example of FIG. 1a, the sensor 310 may be configured to sense radiation 325 reflected from a plurality of different zones. Each zone of the plurality of zones may define an area or field sensed by the sensor 310. Each area or field may be distinct, or may at least partially overlap an area of field of a zone defined by at least one adjacent zone. Operation of such a multi-zone sensor is described in more detail below with reference to FIGS. 6a to 6c.

The mirror 330 is disposed in a radiation path from the sensor 310 to the target 305. The mirror 330 reflects the radiation 325a, 325b.

As such, radiation 325b which is depicted as a solid line in FIG. 3a, is emitted by the sensor 310, and propagates towards the mirror 330 and is reflected from the mirror 330 toward the target 305. Radiation reflected from the target 305 then propagates toward the mirror 330 and is reflected back towards the sensor 310. As such, at least a portion of the reflected radiation 325b received by the sensor 310 is reflected from the target 305, via the mirror 330.

However, in some instances at least a portion of the radiation 325a is reflected directly from the mirror to the sensor 310, and is not reflected from the target 305. That is, at least a portion of the radiation 325a emitted by the sensor 310 propagates to the mirror and is reflected back to the sensor 310 without reflecting off the target 305. This radiation 325a is depicted as a dashed line in FIG. 3a, and is shown as a direct path between the mirror 330 and the sensor 310.

The example in FIG. 3a may correspond to a use-case of a user, e.g. the target 305, taking a photograph of a reflection of himself or herself in the mirror 330 using the imaging device 315, e.g. the user's cellular telephone.

Figure 3B:
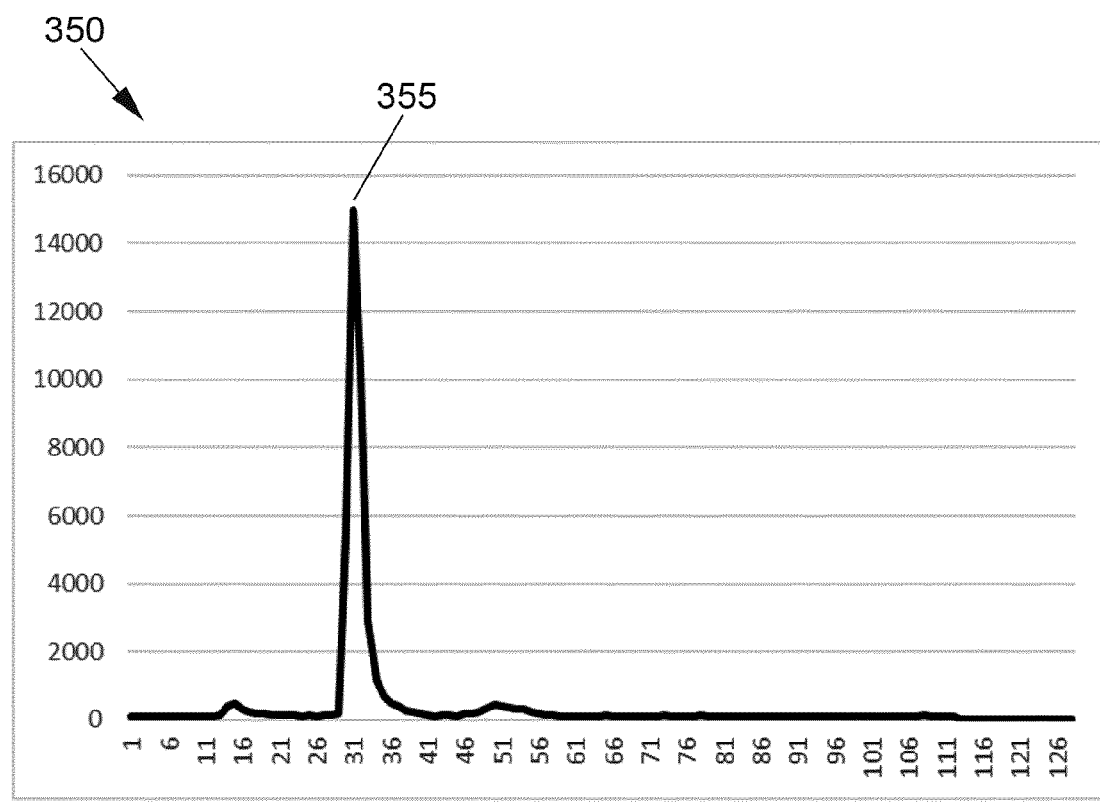

FIG. 3b depicts an example of a histogram 350 corresponding to data from the sensor 310 of FIG. 3a. The sensor 310, e.g. the time-of-flight sensor, or processing circuitry associated with the sensor 310, may provide data corresponding to a count of sensed photons as a function of time. As described above, such a count corresponds to a distance, and the data may be provided, or stored, in a format or structure corresponding to the example histogram 350.

The data depicted in the histogram 350 comprises a peak 355, which substantially corresponds to radiation reflected from the mirror 330. As such, the sensor 310 may, in some instances, be used to determine a proximity of the mirror 330 to the sensor.

Figure 3C:
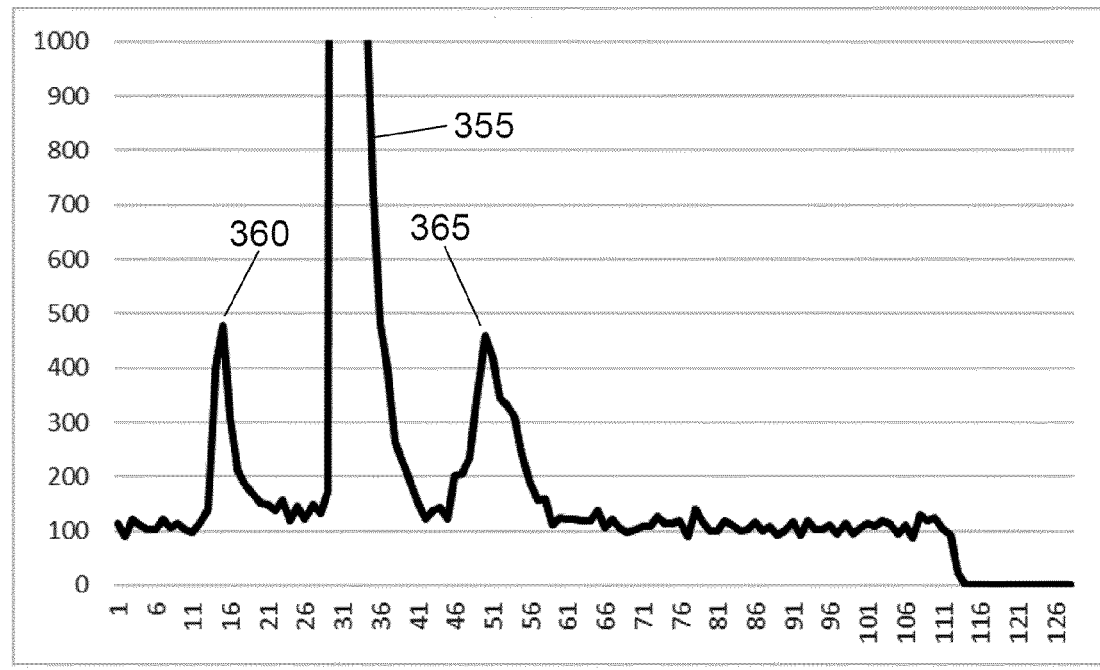
FIG. 3c depicts a magnified portion of the histography of FIG. 3b.

FIG. 3c, which depicts a magnified portion of the histogram of FIG. 3b, clearly shows three distinct peaks 355, 360, 365. The peaks 355, 360, 365 correspond to reflected radiation above a threshold defined by a noise level, as described above with reference to FIG. 1b. In the example of FIG. 3c, the noise level is between approximately 50 and 150 counts. As such, a first peak 360 having a magnitude of approximately 480 counts is clearly distinguishable over the noise level. Similarly, a third peak 365 having a magnitude of approximately 450 counts is clearly distinguishable over the noise level.

In the example of FIG. 3c, the first peak 360 corresponds to a cover glass, as described above with reference to FIG. 1b. As such, processing circuitry may readily determine from the data depicted in histogram 350 that the first peak 360 corresponds to the cover glass, because the first peak 360 occurs at a time corresponding to a distance known to be the fixed between the sensor 310 and the cover glass.

The second peak 355 is substantially greater in magnitude than the first peak 360 or the third peak 365. The second peak 355 corresponds to sensed radiation reflected from the mirror. Due to the relatively perpendicular orientation of the sensor 310 relative to the mirror 330, the reflected radiation comprises a substantial component of reflected specular radiation. The reflected radiation may also comprises a component of diffuse radiation, e.g. radiation that is more generally reflected from the mirror 330 due to, for example, the above described impurities, artefacts, dirt, dust or the like on or in the mirror.

The third peak 365 is substantially smaller in magnitude than the second peak 355. The third peak 365 corresponds to sensed radiation reflected from the target 305.

Figure 4A:
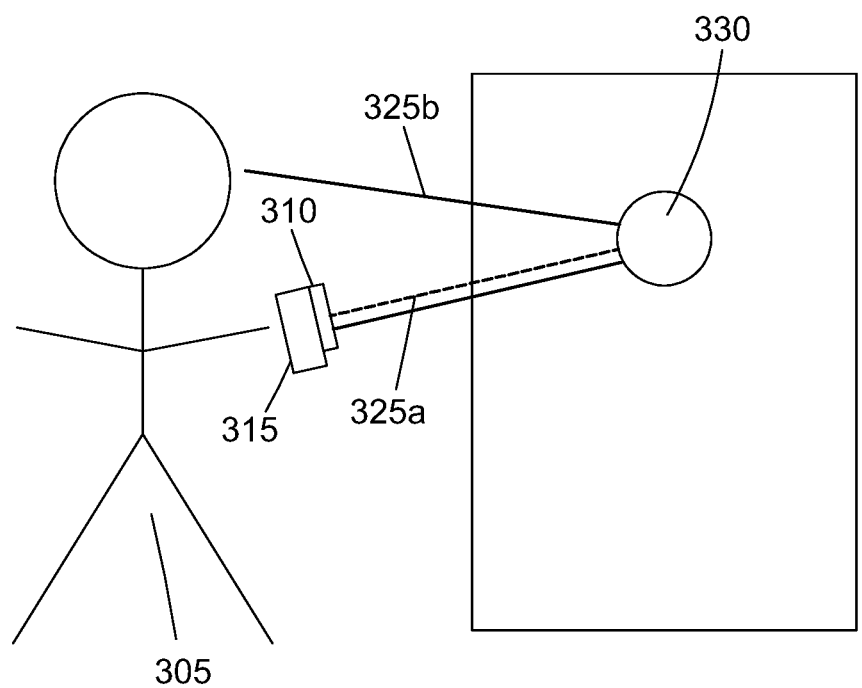
FIG. 4a a representation of the imaging device at an angle relative to the mirror.

FIG. 4a depicts a representation of the imaging device 315 an angle e.g. not perpendicular, relative to the mirror 330. In a similar manner to the example of FIG. 2a, in this instance only a portion of the radiation 325b emitted from the sensor 310, e.g. the time-of-flight sensor, is reflected back to the sensor 310 from the target 305, via the mirror 330.

In contrast to the example of FIG. 3a, a portion of the radiation that is reflected from the mirror 330 is not incident upon the sensor 310. That is, an amount of specular radiation sensed by the sensor 310 is substantially reduced. This is because, taking account for an angle of incidence of the radiation on the mirror 330 and an angle of reflection of the radiation from the mirror 330, a portion of the reflected radiation is not directed toward the sensor 310.

A portion of radiation 325a, e.g. diffuse radiation, may be detected by the sensor 310. Such diffuse radiation may be due, at least in part, to dirt, debris and/or other anomalies or artefacts present on or in the mirror 330, causing radiation 325a to be reflected in the direction of the sensor 330.

Figure 4B:
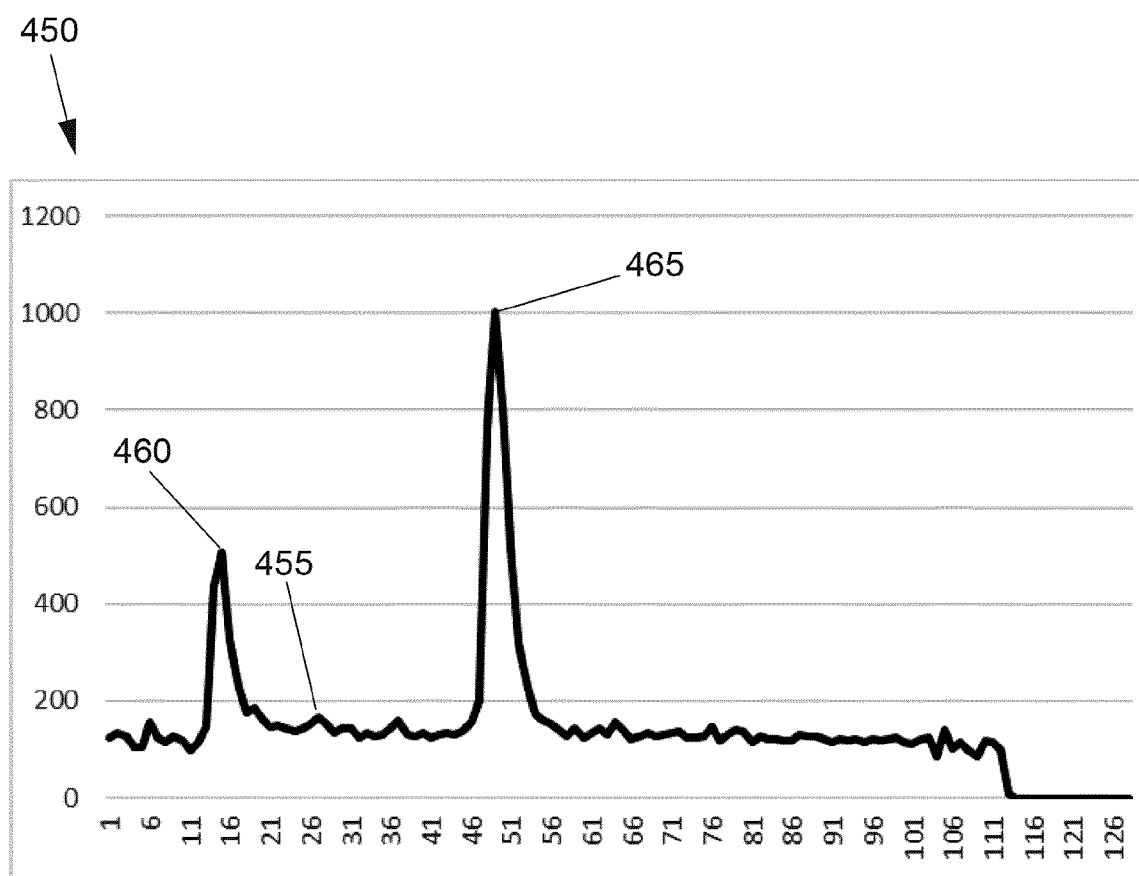

FIG. 4b depicts an example of a histogram 450 corresponding to data from the sensor of FIG. 4a. FIG. 4b clearly shows two distinct peaks 460, 465. As described above, the peaks 460, 465 correspond to reflected radiation above a threshold defined by a noise level.

The data depicted in the histogram 450 comprises a first peak 460 above the noise level. As described above, the first peak corresponds to a cover glass.

The data depicted in the histogram 450 also comprises a small second peak 455, which substantially corresponds to diffuse radiation reflected from the mirror 330. In this example the mirror 330 is particularly clean, and as such a magnitude of the second peak is relatively low. It will be noted that a magnitude of a peak 455 of a sensed reflection from the mirror 330 is substantially less than a magnitude of a peak 355 of sensed reflection from the mirror 330 depicted in FIG. 3c. As described above, this is due to specular reflection of the radiation 325a not being detected by the sensor 310 due to angle of the sensor 310 relative to the mirror 330.

The histogram 450 of FIG. 4b also depicts a third peak 465. The third peak 465 corresponds to sensed radiation 325b reflected from the target 305, as depicted in FIG. 4a.

Thus, it can be observed that by comparing histograms of data sensed from a target reflected in a mirror 330 substantially perpendicular to the sensor 310, e.g. equivalent to in a first zone relative to the sensor 310, and also at an angle relative to the sensor 310, e.g. equivalent to in a second zone relative to the sensor 310, the absence of the second peak 355, or substantial reduction in the magnitude of the second peak 355, indicates that a mirror 330 may be present.

Based on the above described principles, a presence detection system such as a system implemented on a camera in a cellular telephone, may be configured to detect a presence of a window 130 or a mirror 330. Such a system comprises a time-of-flight sensor configured to detect a proximity to a target 105, 305 based on reflected radiation 125a, 125b, 325a, 325b sensed from a plurality of zones and processing circuitry configured to determine a presence of a mirror or window in a path from the time-of-flight sensor to the target based on one or more peaks in data corresponding to the sensed radiation reflected from each of the plurality of zones. That is, processing circuitry within such a system may be configured to determine of the presence of the mirror 330 or the window 130 by comparing data corresponding to at least two zones of the plurality of zones.

In an embodiment of the invention, a presence detection system may be configured such that, if sensed data comprises: a peak 155, 355 corresponding to a first distance from the sensor 110, 310 and a peak 165, 365 corresponding to a second distance from the time-of-flight sensor in a first zone of a plurality of zones; and a peak 255, 455 substantially corresponding to the first distance and a peak 265, 465 substantially corresponding to the second distance in a second zone of the plurality of zones; and the second distance is further than the first distance; and the peaks are not associated with reflections from a cover glass; then the processing circuitry may determine that the peak 155, 355 corresponding to the first distance from the time-of-flight sensor corresponds to reflections from a mirror 330 or a window 130.

Furthermore, if the second distance is substantially double the first distance, then the processing circuitry may determine that the peak 155, 355 corresponding to the first distance from the sensor 110, 310 corresponds to reflections from a mirror 330.

Figure 5A:
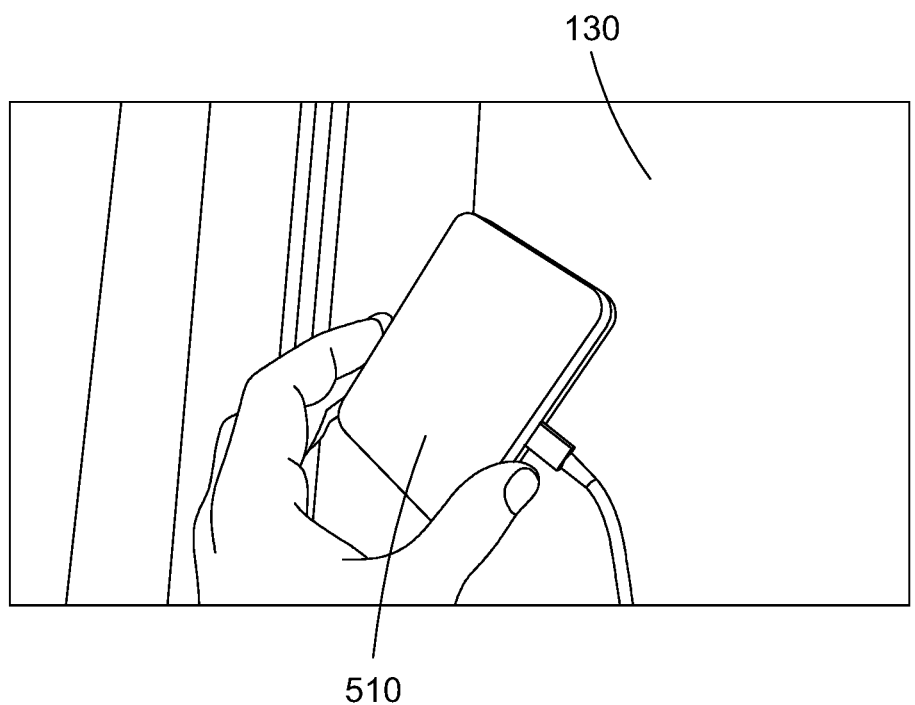
FIG. 5a a photograph of a use case of the sensor held against or close to a window.

FIG. 5a is a photograph of a particular use case wherein a camera 510 comprising the sensor 110, 310, is placed very close to, or against, the window 130. This use case may occur when a user attempts to take a photograph through a window, while avoiding visible light reflections in the window.

Figure 5B:
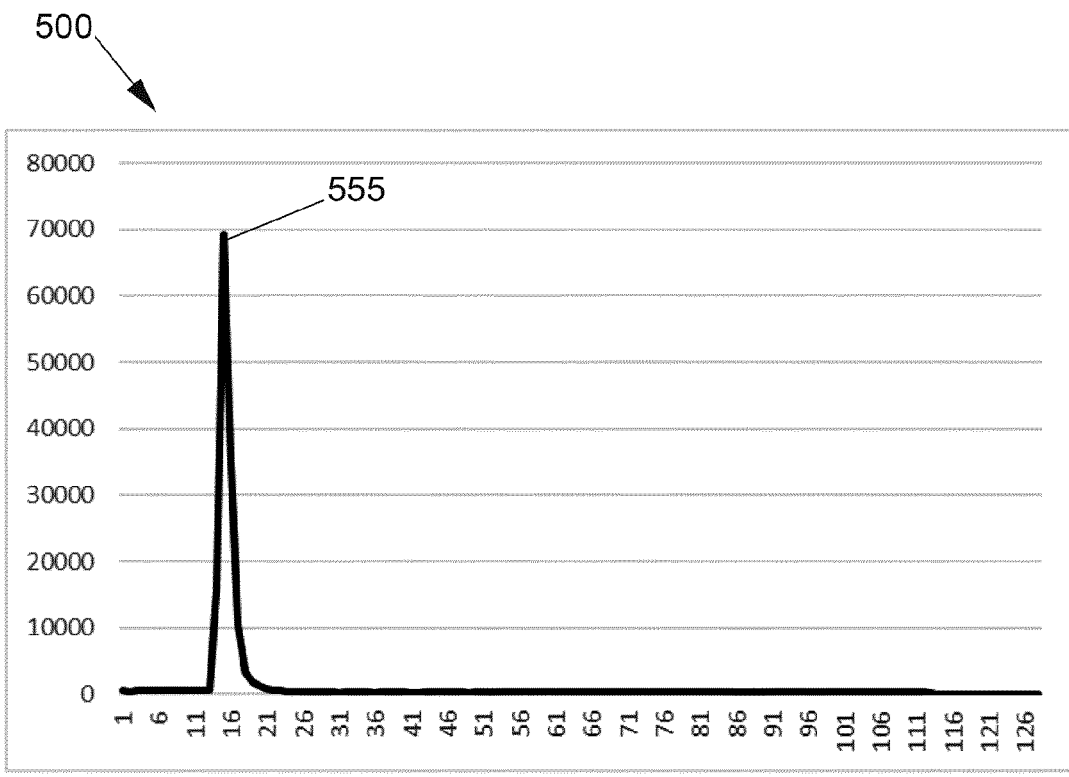
FIG. 5b an example of a histogram corresponding to data from a first zone of sensor of the imaging device held against a window.

FIG. 5b depicts an example of a histogram 500 corresponding to data from a first zone of a sensor held against the window 130. The first zone is orientated substantially perpendicular to a surface of the window. A first peak 555 of substantial magnitude is shown in FIG. 5b. The first peak 555 corresponds to crosstalk and target peak overlap. For example, the peak 555 may correspond to a substantial reflection from the window 130. Furthermore, reflections from the cover glass may be obscured in the data due to a proximity of the window to the cover glass.

Figure 5C:
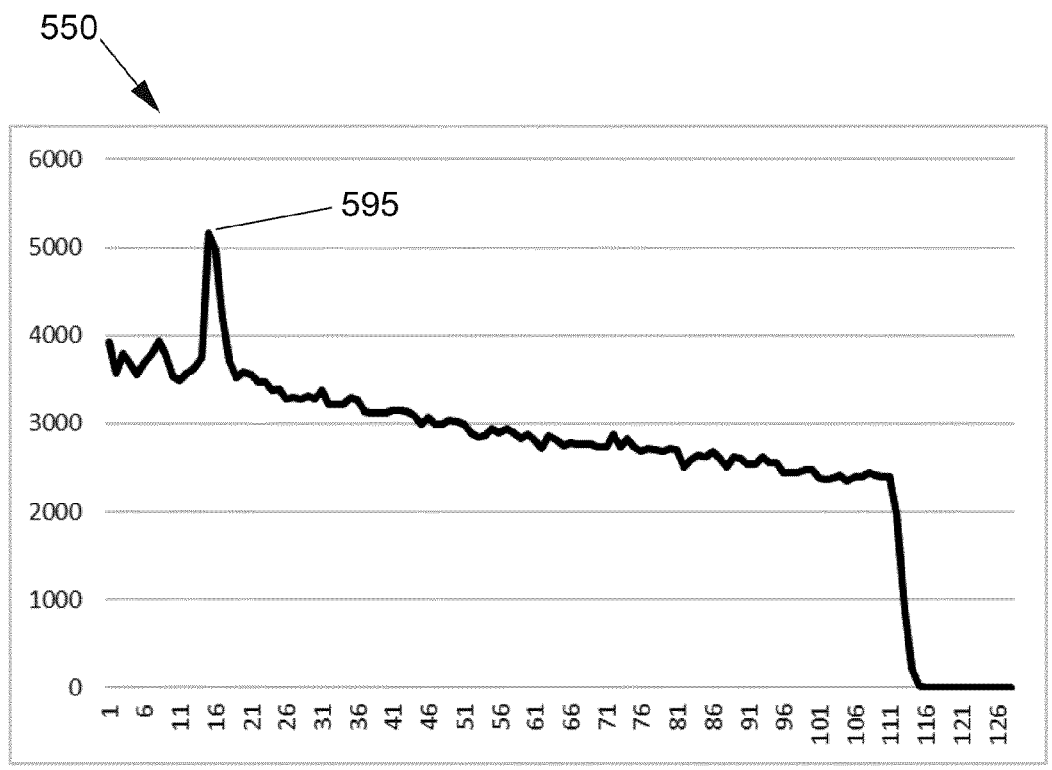
FIG. 5c an example of a histogram corresponding to data from a second zone of sensor held against a window.

FIG. 5c depicts an example of a histogram 550 corresponding to data from a second zone of the sensor held against the window 130. The second zone is orientated at an angle, e.g. not perpendicular, to a surface of the window 130. A first peak 595 of is shown in FIG. 5c. The first peak 595 corresponds to reflections from the cover glass. Notably, a magnitude of the peak 595 is substantially less than a magnitude of the peak 555 depicted in FIG. 5b. That is, in the first zone perpendicular to the window, the sensor detects an object, e.g. the window 130. In the second zone at an angle, e.g. not perpendicular to the window 130, the sensor does not detect the object, e.g. the window 130.c In an embodiment of the invention, a presence detection system may be configured such that, if sensed data comprises: a peak 555 with a magnitude above a first threshold corresponding to a relatively short distance from the sensor 110, 330 in the first zone of the plurality of zones, the relatively short distance defined by a second threshold, and substantially no peak or a relatively small peak 595 corresponding to the relatively short distance from the sensor 110, 330 in the second zone of the plurality of zones; then processing circuitry may determines that the sensor 110, 330 is disposed at the relatively short distance from a window 130.

The relatively short distance may be, for example, in the range of millimetres. The relatively short distance may be, for example, a distance generally comparable in magnitude to a distance from the time-of-flight sensor to a cover glass. That is, the relatively short distance may be a distance in the region of one inch, or less.

Figure 6A:
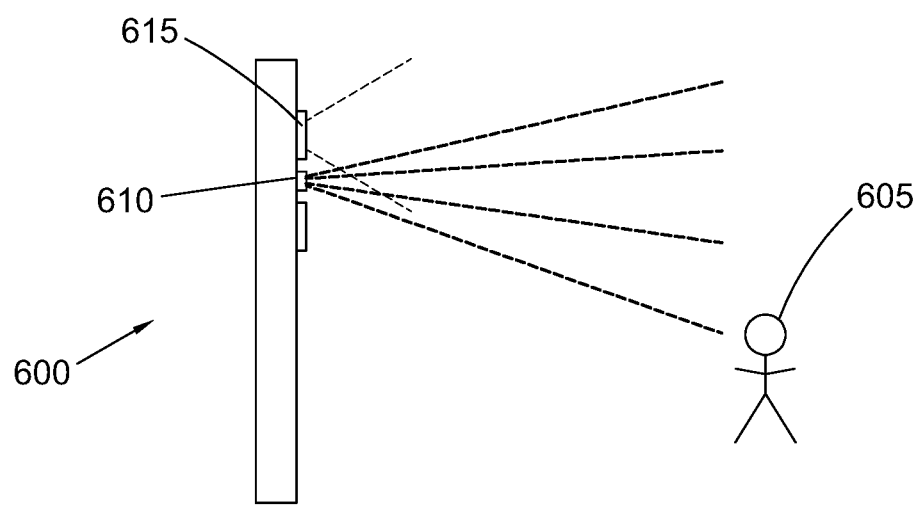
FIG. 6a a representation of an apparatus comprising an imaging system with an adjustable focus, and a presence detection system according to an embodiment of the disclosure.

FIG. 6a depicts a representation of an apparatus 600 comprising an imaging system with an adjustable focus, and a presence detection system according to an embodiment of the disclosure. The apparatus 600 is a cellular telephone and the presence detection system comprises a multi-zone time-of-flight sensor 610, and a camera 615 with an adjustable focus. A target 605 is also shown.

Since the time-of-flight sensor is capable of multi-zone detection, and since the sensor 610 is capable of multi-object detection in each zone, e.g. producing a corresponding histogram with a plurality of peaks, then the apparatus 600 may be configured to detect a presence of a mirror 330 or window 130 in a path between the sensor 610 and the target 605. That is, as described above, histograms corresponding to a plurality of zones may be compared to determine whether a window or mirror is present in the path between the sensor 610 and the target 605. In one example embodiment, such a determination may be made by processing circuitry within the apparatus. In some example embodiments, at least a portion of the processing circuitry and/or storage such as one or more memory devices associated with the processing circuitry, may be remote from the apparatus 600. For example, at least a portion of the processing circuitry may be provided on one or more servers and/or cloud-based devices. At least a portion of the processing circuitry may be provided on a remote console or client device.

The apparatus 600 may be configured to adjust a focus of the camera 615 based at least in part upon a detected proximity of the target 605 to the sensor 610. The detected proximity to the target 605 may be accurately and reliably determined by determining whether a mirror or window is present in a path between the target 605 and the sensor 610, as described above.

Figure 6B:
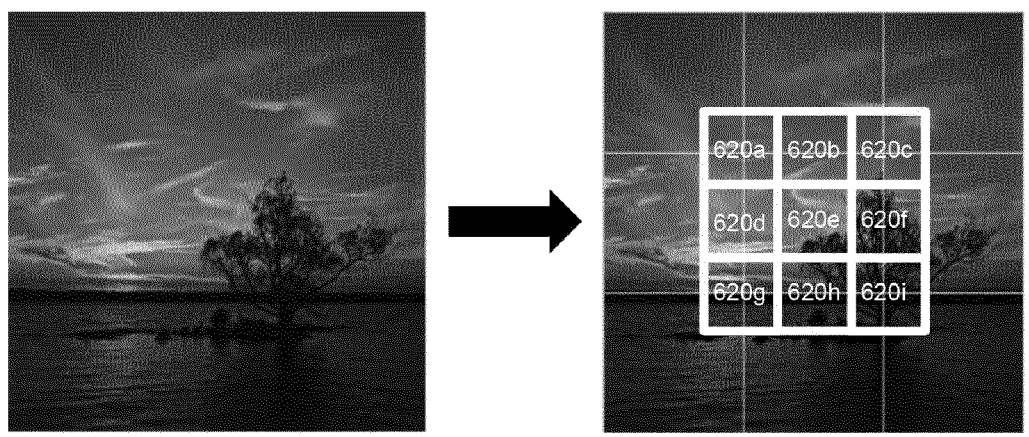

FIG. 6b depicts a representation of zones sensed by the multi-zone sensor of the apparatus of FIG. 6a. A scene is divided into a 3×3 array of zones, denoted 620a-620i. Each zone corresponds to an area or field sensed by the sensor 610. It will be appreciated that the 3×3 array is depicted for purposes of example only, and in other embodiments the plurality of zones may comprise a 2×2, 4×4 or an even larger array of zones. Furthermore, the plurality of zone need not necessarily define a square as shown in FIG. 6b. For example, each zone may be a non-square shape and/or the array may have other dimensions, such as 3×4, 2×3, or the like. Furthermore, each zone may be distinct or may at least partially overlap an adjacent zone.

The time-of-flight sensor 610 is configured to perform multi-object detection in each zone 620a-620j of the plurality of zones. As such, the apparatus 600, and in particular processing circuitry within the apparatus 600 or associated with the apparatus 600, may acquire histogram data corresponding to each zone 620a-620j. By comparisons of such acquired histogram data, a determination of a presence of a window 130 or mirror 330 may be made, as described above with reference to FIGS. 1a to 5c.

Figure 7A:
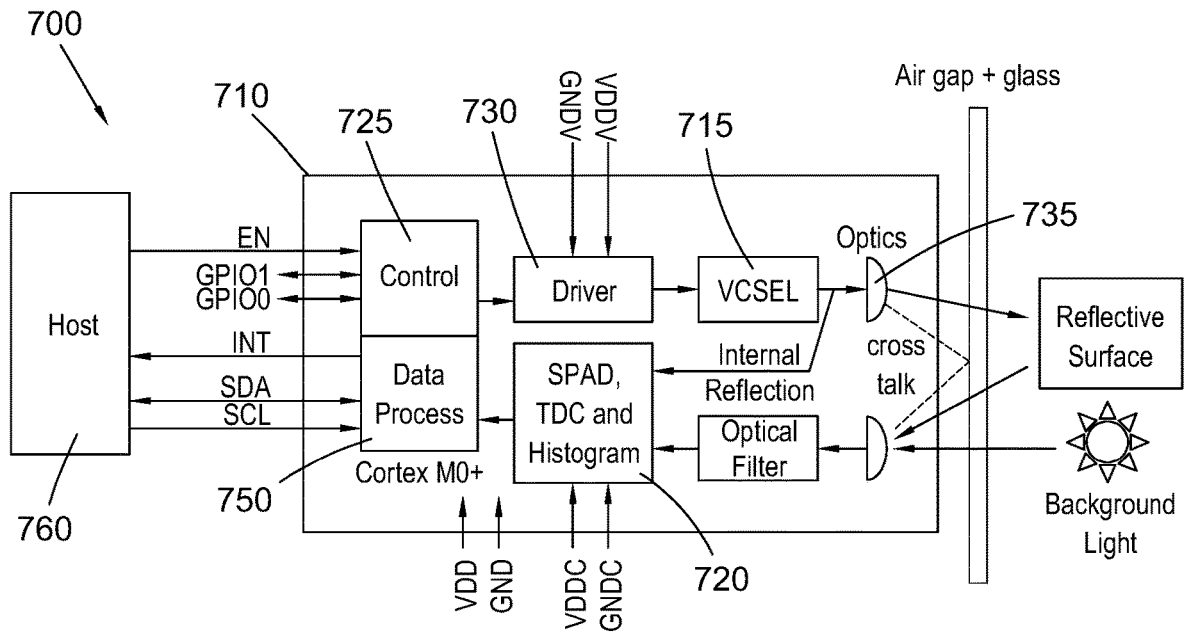
FIG. 7a a block diagram of a presence detection system.

FIG. 7a depicts a block diagram of a presence detection system 700 according to an embodiment of the disclosure. The system 700 comprises a multi-zone time-of-flight sensor 710. The multi-zone time-of-flight sensor 710 comprises a VCSEL 715 configure to emit radiation, and an array of SPADs 720 for detecting radiation. The SPADs 720 have associated TDC and histogram circuitry. The multi-zone time-of-flight sensor 710 also comprises control circuitry 725 and driver circuitry 730 for the VCSEL. In the example embodiment, optics 735 are depicted which may comprise, for example, one or more lenses, multi lens array(s) (MLA), diffractive optical elements (DOEs) and/or optics filters.

The multi-zone time-of-flight sensor 710 also comprises processing circuitry 750, which in the example embodiment of FIG. 7a is an ARM Cortex M0+. In some embodiments, the processing circuitry 750 is configured to determine a presence of a mirror 330 or window 130 in a path from the multi-zone time-of-flight sensor 710 to a target based on one or more peaks in data in histogram data corresponding to sensed radiation reflected from each of a plurality of zones. Also shown is a host device 760. The host device 760 is communicably coupled to the multi-zone time-of-flight sensor 710. The host device 760 comprises further processing circuitry. The host device may be, for example, processing circuitry within a cellular telephone. As described above, the host device 760 may be remote from the multi-zone time-of-flight sensor 710, e.g. on a remote server or cloud based device.

In some embodiments, the host device 760 is configured to determine a presence of a mirror 330 or window 130 in a path from the multi-zone time-of-flight sensor 710 to a target based on one or more peaks in data in histogram data corresponding to sensed radiation reflected from each of a plurality of zones. That is, in some embodiments, internal processing circuitry 750 within the time-of-flight sensor 710 may be configured to communicate data, e.g. histogram data to the host device 760, such that the host device 760 can determine the presence of a window or mirror.

Figure 7B:
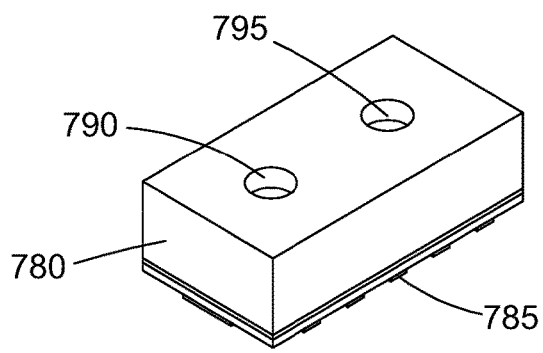
FIG. 7b a diagram of a packaged presence detection system.

FIG. 7b depicts a package 780, the package 780 housing the presence detection system 700 of FIG. 7a. The package comprises electrical contacts 785 for coupling the presence detection system 700 to another device, such as the host device 760. The package 780 comprises a first aperture 790 for emitting radiation, e.g. radiation emitted by the VCSEL 715. The package 780 comprises a second aperture 795 for receiving reflected radiation, e.g. for received radiation to be incident upon the array of SPADs 720.

In some embodiments, the above-described cover glass may be integrated into the package 780 such that it provides a protective cover over the first aperture 790 and/or the second aperture 795.

The Applicant discloses in isolation each individual feature described herein and any combination of two or more such features, to the extent that such features or combinations are capable of being carried out based on the specification as a whole in the light of the common general knowledge of a person skilled in the art, irrespective of whether such features or combinations of features solve any problems disclosed herein, and without limitation to the scope of the claims. The applicant indicates that aspects of the disclosure may consist of any such individual feature or combination of features. In view of the foregoing description it will be evident to a person skilled in the art that various modifications may be made within the scope of the disclosure.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure, which are contemplated as falling within the scope of the appended claims. Each feature disclosed or illustrated in the present specification may be incorporated in any embodiments, whether alone or in any appropriate combination with any other feature disclosed or illustrated herein.

| List of Reference Numerals | |
|---|---|
| 105 | target |
| 110 | sensor |
| 115 | imaging device |
| 120 | camera |
| 125 | radiation |
| 125a | radiation |
| 125b | radiation |
| 130 | window |
| 150 | histogram |
| 155 | second peak |
| 160 | first peak |
| 165 | third peak |
| 200 | histogram |
| 255 | second peak |
| 260 | first peak |
| 265 | third peak |
| 305 | target |
| 310 | sensor |
| 315 | imaging device |
| 325a | radiation |
| 325b | radiation |
| 330 | mirror |
| 350 | histogram |
| 355 | second peak |
| 360 | first peak |
| 365 | third peak |
| 450 | histogram |
| 455 | second peak |
| 460 | first peak |
| 465 | third peak |
| 500 | histogram |
| 510 | camera |
| 555 | first peak |
| 550 | histogram |
| 595 | first peak |
| 600 | apparatus |
| 605 | target |
| 610 | sensor |
| 615 | camera |

-continued

List of Reference Numerals

| | |
|---|---|
| 620a | zone |
| 620b | zone |
| 620c | zone |
| 620d | zone |
| 620e | zone |
| 620f | zone |
| 620g | zone |
| 620h | zone |
| 620i | zone |
| 700 | presence detection system |
| 710 | time-of-flight sensor |
| 715 | VCSEL |
| 720 | SPAD |
| 725 | control circuitry |
| 730 | driver circuitry |
| 735 | optics |
| 750 | processing circuitry |
| 760 | host device |
| 780 | package |
| 785 | electrical contacts |
| 790 | first aperture |
| 795 | second aperture |

The invention claimed is:

1. A presence detection system configured to detect a presence of a window or a mirror, the system comprising:
a time-of-flight sensor configured to detect a proximity to a target based on reflected radiation sensed from a plurality of zones; and
processing circuitry configured to determine a presence of a mirror or window in a path from the time-of-flight sensor to the target based on one or more peaks in data corresponding to the sensed radiation reflected from each of the plurality of zones,
wherein, if the data comprises:
a peak with a magnitude above a first threshold corresponding to a relatively short distance from the time-of-flight sensor in a first zone of the plurality of zones, the relatively short distance defined by a second threshold,
and substantially no peak corresponding to the relatively short distance from the time-of-flight sensor in a second zone of the plurality of zones,
then the processing circuitry determines that the time-of-flight sensor is disposed at the relatively short distance from a window.

2. The presence detection system of claim 1, wherein the one or more peaks in data correspond to reflected radiation above a threshold defined by a noise level.

3. The presence detection system of claim 1, wherein the data corresponds to a distribution of a number of sensed photons as a function of a distance from the time-of-flight sensor.

4. The presence detection system of claim 1 wherein the processing circuitry is configured to determine the presence of the mirror or the window and/or characteristics of the mirror or the window by comparing data corresponding to at least two zones of the plurality of zones.

5. The presence detection system of claim 1 wherein, if the data comprises:
a peak corresponding to a first distance from the time-of-flight sensor and a peak corresponding to a second distance from the time-of-flight sensor in the first zone of the plurality of zones;
a peak substantially corresponding to the first distance and a peak substantially corresponding to the second distance in the second zone of the plurality of zones;
the second distance being further than the first distance, and the peaks not being associated with reflections from a cover glass;
then the processing circuitry determines that the peak corresponding to the first distance from the time-of-flight sensor corresponds to reflections from a mirror or a window.

6. The presence detection system of claim 5 wherein, if the second distance is substantially double the first distance, then the processing circuitry determines that the peak corresponding to the first distance from the time-of-flight sensor corresponds to reflections from a mirror.

7. The presence detection system of claim 5 wherein, if the peak corresponding to the first distance from the time-of-flight sensor has a magnitude above a predefined threshold and/or is characterized by pileup greater than a/the predefined threshold, the processing circuitry determines that the peak corresponding to the first distance from the time-of-flight sensor corresponds to reflections from a mirror.

8. The presence detection system of claim 5 wherein, if the first peak is substantially wider than a width defined by a further predefined threshold, then the processing circuitry determines that the peak corresponding to the first distance from the time-of-flight sensor corresponds to reflections from a window comprising a plurality of panes of glass.

9. The presence detection system of claim 5 wherein the processing circuitry is configured to determine which zone of the plurality of zones comprises a peak with the greatest magnitude substantially corresponding to the first distance, and to indicate that the determined zone is the zone oriented closest to perpendicular relative to the window or mirror.

10. The presence detection system of claim 1 wherein the processing circuitry is configured to correct the data for the effects of pile-up.

11. The presence detection system of claim 1 wherein the processing circuitry configured to determine whether one or more peaks in the data is associated with reflections from a/the cover glass.

12. The presence detection system of claim 1, wherein the processing circuitry is configured to store the data for each of the plurality of zones in bins, wherein each bin corresponds to a number of sensed photons as a function of distance from the time-of-flight sensor.

13. An apparatus comprising:
an imaging system with an adjustable focus, and
a presence detection system comprising a time-of-flight sensor according to claim 1,
wherein the focus of the imaging system is configured to be adjusted to avoid focusing on a window or mirror based on a determination of a presence of a mirror or window in a path from the time-of-flight sensor to a target by the presence detection system.

14. The apparatus of claim 13, wherein the apparatus is one of: a cellular telephone; a camera; or a video recording device; a robotic device; a measuring device; a gaming device; or an automotive device.

15. A method of detecting a presence of a window or a mirror, the method comprising:
configuring a time-of-flight sensor to provide data corresponding to sensed reflected radiation from a plurality of zones; and
analyzing, by processing circuitry, one or more peaks in the data corresponding to the sensed radiation reflected from each of the plurality of zones to determine if a window or a mirror is in a path from the time-of-flight sensor to a target, wherein, if the data comprises:
a peak with a magnitude above a first threshold corresponding to a relatively short distance from the time-of-flight sensor in a first zone of the plurality of zones, the relatively short distance defined by a second threshold,
and substantially no peak corresponding to the relatively short distance from the time-of-flight sensor in a second zone of the plurality of zones,
then the processing circuitry determines that the time-of-flight sensor is disposed at the relatively short distance from a window.

* * * * *